(12) United States Patent　(10) Patent No.: US 10,765,203 B2
Tiefnig et al.　(45) Date of Patent: Sep. 8, 2020

(54) APPARATUS FOR FITTING A CARRIER ELEMENT FOR ARTICLES IN A BODY

(71) Applicant: Grass GmbH, Hoechst (AT)

(72) Inventors: Roland Tiefnig, Gaimberg (AT); Simon Mair, Lienz (AT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 15/888,377

(22) Filed: Feb. 5, 2018

(65) Prior Publication Data

US 2018/0220795 A1　Aug. 9, 2018

(30) Foreign Application Priority Data

Feb. 6, 2017　(DE) .................... 20 2017 100 609 U (51) Int. Cl.
| | | |
|---|---|---|
| *A47B 46/00* | (2006.01) | |
| *F24C 15/16* | (2006.01) | |
| *A47B 96/02* | (2006.01) | |
| *F16F 1/36* | (2006.01) | |

(52) U.S. Cl.
CPC .......... *A47B 46/005* (2013.01); *A47B 96/025* (2013.01); *F24C 15/16* (2013.01); *F16F 1/36* (2013.01); *F16M 2200/063* (2013.01); *F16M 2200/068* (2013.01)

(58) Field of Classification Search
CPC ..... A47B 46/00; A47B 46/005; A47B 96/025; F24C 15/16; F24C 15/168
USPC ................... 312/410, 408, 325, 334.2, 334.3
See application file for complete search history.

(56) References Cited

U.S. PATENT DOCUMENTS

| | | | | |
|---|---|---|---|---|
| 316,294 | A | * | 4/1885 | Roberts |
| 569,914 | A | * | 10/1896 | Field |
| 973,573 | A | * | 10/1910 | Sims |
| 1,227,799 | A | * | 5/1917 | Kaub ..................... A47B 53/00 |
| | | | | 312/300 |

(Continued)

FOREIGN PATENT DOCUMENTS

| | | |
|---|---|---|
| DE | 578 161 | 6/1933 |
| DE | 87 01 330 U1 | 10/1987 |

(Continued)

OTHER PUBLICATIONS

Extended European Search Report (Application No. 18154598.9) dated Jun. 21, 2018.

(Continued)

*Primary Examiner* — James O Hansen
(74) *Attorney, Agent, or Firm* — Burr & Brown, PLLC (57) ABSTRACT

An apparatus for fitting a carrier element in a body, including a pivoting member for arranging the carrier element, and fitting means for fitting the pivoting member on a wall of the body. The pivoting member includes two rotatable pivot arms and has three pivot axles. When mounted on the body, a first pivot arm is arranged on the body in a rotatable manner by way of a first pivot axle, the two pivot arms are arranged in a rotatable manner on one another via a second pivot axle, and a third pivot axle is provided on a second pivot arm. Near one end of the second pivot arm, the carrier element is rotatably arranged with respect to the second pivot arm by the third pivot axle, and, during a pivoting and/or displacement movement of the pivoting, a carrier element arranged thereon is movable in a single, exclusively horizontal plane.

6 Claims, 4 Drawing Sheets

(56) References Cited

U.S. PATENT DOCUMENTS

| | | | | |
|---|---|---|---|---|
| 1,893,805 | A | * | 1/1933 | Morrison ............... F25D 25/02 126/337 R |
| 2,564,336 | A | * | 8/1951 | Lien ..................... A47B 81/067 312/273 |
| 3,081,138 | A | | 3/1963 | Stebbins |
| 3,278,247 | A | * | 10/1966 | Tisdell .................. A47B 81/00 211/86.01 |
| 5,447,146 | A | * | 9/1995 | Nickerson ............... F24C 15/16 126/332 |
| 6,969,132 | B1 | * | 11/2005 | Viville ................... A47B 31/02 211/1.3 |
| 8,794,722 | B2 | * | 8/2014 | Nuss ..................... F25D 25/025 312/334.2 |
| 2005/0174022 | A1 | | 8/2005 | Kuttalek |

FOREIGN PATENT DOCUMENTS

| | | |
|---|---|---|
| DE | 101 24 458 A1 | 11/2002 |
| DE | 102 43 551 A1 | 4/2004 |
| DE | 10 2009 029 4 | 3/2011 |
| EP | 1 258 686 A1 | 11/2002 |
| NZ | 543764 A | 10/2008 |
| WO | 2004/025186 A1 | 3/2004 |

OTHER PUBLICATIONS

German Search Report (Application No. 20 2017 100 609.3) dated Jan. 9, 2018.
Chinese Office Action (Application No. 201810117749.2) dated Apr. 8, 2019 (with English translation).

* cited by examiner

APPARATUS FOR FITTING A CARRIER ELEMENT FOR ARTICLES IN A BODY

This application claims the benefit under 35 USC § 119(a)-(d) of German Application No. 20 2017 100 609.3 filed Feb. 6, 2017, the entirety of which is incorporated herein by reference.

FIELD OF THE INVENTION

The present invention relates to an apparatus for fitting a carrier element for articles in a body, a carrier element for such an apparatus, and a body having such an apparatus and/or such a carrier element.

BACKGROUND OF THE INVENTION

Apparatuses for fitting a carrier element for articles in a body are already known.

A known apparatus comprises a pivot arm on which a tray, for example, a shelf, is arrangeable, wherein the pivot arm is mounted in a rotatable manner on a pivot axle on the front side of a side wall of a compartment of an oven such that a tray arranged on the pivot arm is able to be rotated out of an interior of the compartment by way of a horizontal rotary movement.

A drawback of this known apparatus is the comparatively large compartment interior area that is necessary for the rotary movement.

SUMMARY OF THE INVENTION

The present invention is based on the object of providing an improved apparatus for fitting a carrier element for articles in a body. In particular, to provide an apparatus which makes it possible to move a carrier element arranged on the apparatus entirely out of an interior area of the body into an exterior area of the body, and vice versa.

The present invention proceeds from an apparatus for fitting a carrier element for articles in a body, and, in particular, the present invention proceeds from an apparatus for fitting a shelf in an oven, wherein the apparatus has a pivoting member for arranging the carrier element, and fitting means, wherein the pivoting member is able to be fitted in the body, on a wall portion of the body, by way of the fitting means.

The apparatus is advantageously provided as a shelf moving device or, for example, as a stove or oven shelf moving device for a stove or oven. It is also conceivable for the apparatus to be configured as a push-in-element or drawer moving device.

A body is understood to be an entity which encloses a space, in particular, a cavity. Advantageously, the body encloses the cavity on five sides. It is also conceivable for the body to have a door and/or flap with which the cavity is able to be enclosed on the sixth side. A body should be understood as being, for example, a furniture carcass, for example, in the form of a cabinet, sideboard, container, table or wall unit. However, a body is also understood as being, for example, a stove or oven, a microwave or, for example, a dishwasher.

A carrier element is understood to be, for example, a push-in element, for example, a shelf, for example, a baking tray, a baking rack or a roasting tin to be fitted on an oven. Also considered as carrier element is, for example, a movable cabinet base or a movable cabinet compartment or, for example, a drawer.

A wall portion of the body should be considered to be, for example, a portion or region of a side wall, rear wall, top side and/or underside of the body. Advantageously, the side wall, rear wall, top side and/or underside encloses a cavity of the body. For example, a side wall comprises an inner side which faces the cavity of the body and bounds the cavity. In particular, the apparatus is arrangeable on a region or portion of the inner side of the side wall and/or rear wall.

The essential aspect of the present invention can thus be considered to be that the pivoting member comprises two pivot arms which are provided in a rotatable manner with respect to one another, wherein the pivoting member has three pivot axles, wherein, in the state mounted on the body, a first pivot arm is arranged on the body in a rotatable manner by way of a first pivot axle, wherein the two pivot arms are arranged in a rotatable manner on one another via a second pivot axle, wherein a third pivot axle is provided on a second pivot arm, wherein, in the region of one end of the second pivot arm, the carrier element is arrangeable in a rotatable manner with respect to the second pivot arm by way of the third pivot axle, and wherein, in the state of the pivoting member arranged on the body, during a pivoting and/or displacement movement of the pivoting member, a carrier element arranged thereon is movable in a single, exclusively horizontal movement plane, with the result that the carrier element arranged on the pivoting member can be moved into the body or out of the latter.

As a result, the carrier element is movable entirely out of the body, in particular, out of a cavity of the body, or into the body, in particular into the cavity of the body.

A pivot axle is preferably configured perpendicularly to the movement plane of the pivoting member. The pivot axles are provided, for example, in a manner oriented parallel to one another. The pivoting member is configured and arrangeable on the body, for example, in the cavity of the body, for example, in the compartment of the oven, for example, such that the carrier element is movable into the body, in particular the cavity of the body, for example, into the compartment, or out of the latter, in particular, exclusively by way of a translational, for example, rectilinear movement, for example, in a single horizontal plane. One pivot axle is provided in a manner oriented, for example, vertically in the state arranged on the body. Advantageously, the pivot axles are oriented parallel to a side wall and/or rear wall in the state arranged on the body.

Advantageously, the first pivot arm is arranged in a rotatable manner on a first pivot axle in a rear region of a cavity of the body, in particular, of a compartment of an oven.

The pivoting member is configured, for example, for the arrangement of a single carrier element. Advantageously, the apparatus comprises two pivoting members or, for example, three pivoting members, in particular, a plurality of pivoting members. In this case, the pivoting members are provided in a manner spaced apart from one another, for example, in a vertical direction. Advantageously, a plurality of pivoting members are provided on the apparatus in mutually different, in particular, spaced-apart movement planes. For example, the movement planes are configured in a manner parallel to one another.

It is furthermore conceivable for components of the apparatus, in particular all the components, to be made of metal, plastics material and/or a combination of the materials. It is also conceivable for the components of the apparatus to be designed to be insensitive and/or resistant to comparatively high temperatures, comparatively high humidity and/or basic materials, for example, soap.

The apparatus, in particular, a piece of furniture having the apparatus, is advantageously configured in a manner capable of pyrolysis. For example, all parts of the apparatus and/or of the oven, in particular bearings or axles of the apparatus are designed such that they are designed for heating to above 200° C., in particular for heating to 200° C. to 900° C., for example, for heating to above 500° C., without losing their function.

It is also advantageous that the pivoting member is provided such that a first end of the first pivot arm is arrangeable in a rear third of a cavity of the body, in particular, in the rear third of a compartment of the oven. As a result, the apparatus is provided in a comparatively space-saving manner.

Preferably, the pivoting member is arrangeable on a rear wall, side wall, top side and/or underside of the body, for example, of the cavity of the body, for example, of the oven, in particular, of the compartment. Advantageously, the pivoting member is able to be mounted, as seen in a horizontal plane, either on a central region or on a lateral region of the rear wall of the body. It is also conceivable for the pivoting member to be fittable on a rear region, in particular, on a rear third of the body, for example, of the cavity of the body, in particular of the compartment. It is conceivable for the pivoting member to be arrangeable on a rear third of the side wall, in particular, of the inner side of the side wall.

It likewise proves to be advantageous for the apparatus, in particular the pivoting member, to have damping means in order to damp any movement of the apparatus, in particular of the arranged carrier element.

The damping means are configured, for example, to damp or brake a movement of a pivot arm. A damping means is formed, for example, from an elastic material, for example, from rubber or plastics material, and/or provided as spring means. The damping means can be formed on the apparatus such that it damps a movement of the apparatus by acting between the body and the arranged apparatus and/or by acting between parts of the apparatus, for example, between the first and the second pivot arm and/or between a pivot arm and an arranged carrier element. The damping means are configured, in particular, as end-position damping means. Advantageously, the damping means are configured such that a movement of the apparatus between two end positions, for example, between a closed position of the apparatus in the body and an open position of the apparatus, for example, in a position outside the body, is not damped and a damping action of the damping means takes place only shortly before the end position, for example, the closed position or the open position, is reached until the end position is reached, such that a movement of the apparatus and/or of the arranged carrier element is not braked for example abruptly and/or jerkily at the end position.

It is furthermore proposed that two pivoting members be provided, which are configured to be arrangeable on the body in a mirror-symmetrical manner with respect to one another.

If the apparatus comprises two pivoting members, which are intended to move a single arranged carrier element, it is conceivable for both pivoting members to be provided in such a way that they are mountable opposite one another and, for example, in a manner spaced apart from one another on the rear side of the body, in particular, on the inner side of the rear side in an, in particular, horizontal plane. For example, a first pivoting member is arrangeable on a left-hand half and a second pivoting member on a right-hand half of the rear side. It also proves to be advantageous for the apparatus to have a synchronization unit which is configured to synchronize a movement of the two pivoting members arranged on the body. The synchronization unit can, to this end, comprise gear wheels, belts, linkages and/or racks. For example, a movement of the two pivoting members is, in particular, the two pivoting movements are coupled together in an arranged state on the body by means of a linkage and/or a rack.

Furthermore, it proves to be advantageous for the pivoting member to comprise a parallelogram guide.

Advantageously, one pivot arm is provided in a two-part manner and comprises two pivot levers, and, in particular, both pivot arms are provided in a two-part manner. Furthermore, it is preferred for a pivot lever of a pivot arm to be mounted in a pivotable and/or rotatable manner at ends of the pivot lever via pivot axles. Therefore, the pivoting member comprises at least three, for example, six, in particular, eight pivot axles. Furthermore, it is preferred for two pivot levers of a pivot arm of the pivoting member to form a parallelogram, in particular, a parallelogram guide, together with four pivot axles. If both pivot arms are provided as parallelogram guides, the pivoting member is configured as a double parallelogram guide. If, furthermore, for example, movements of the two parallelogram guides are coupled together, the carrier element arranged on the apparatus can execute a linear movement, guided in particular by the apparatus or the pivot arms, in the event of a movement of the pivoting member and thus of the carrier element.

In an advantageous modification of the present invention, the pivoting member is mounted with the first end of the first pivot arm on a height-adjusting device of the apparatus. As a result, in the state of the apparatus arranged on the body, a position of the carrier element in the state arranged on the apparatus is provided so as to be adjustable in terms of height in a vertical direction.

Preferably, the height-adjusting device is configured to be arranged on the rear wall and/or side wall of the body, for example, on the inner side of the rear wall and/or on the inner side of the side wall, in particular, of the compartment. Advantageously, the first pivot arm is mounted in a rotatable manner on the height-adjusting device.

It also proves to be advantageous for the height-adjusting device to have a grid such that the pivoting member is arrangeable in different movement planes on the body, in particular on the compartment, wherein the movement planes are defined by the grid of the height-adjusting device. As a result of the grid of the height-adjusting device, the pivoting member or an arranged carrier element is provided so as to be adjustable in different movement planes comparatively quickly, easily and precisely.

It is furthermore proposed that the pivoting member comprise a receiving device, wherein the receiving device is configured for the arrangement of the carrier element, wherein the receiving device is arranged on the third pivot axle in a movable manner with respect to the second pivot arm. The receiving device is mounted on the third pivot axle, for example, in a movable manner with respect to the second pivot arm. As a result of the receiving device, the carrier element is couplable to the pivoting member in a comparatively easy manner.

It is also conceivable for the receiving device to be configured to arrange a plurality of carrier elements, in particular shelves, for example in a plurality of movement planes, for example baking planes, wherein the movement planes are provided advantageously in a manner spaced apart from and oriented parallel to one another.

For example, the receiving device is configured for the placement of the carrier element, in particular, of the shelf.

It is also conceivable for the receiving device to be provided such that the carrier element is able to be suspended on the receiving device.

Moreover, it is advantageous for the receiving device to be configured in a U-shaped manner, wherein the U-shaped receiving device is provided such that the carrier element is arrangeable on both legs of the U of the receiving device. As a result, the carrier element is arrangeable on the receiving device comparatively easily.

The receiving device is provided for example as a U-shaped frame that is open on one side. The two spaced-apart legs, located opposite one another, of the U are connected together via a cross strut at one end of the legs. The legs are advantageously oriented parallel to one another. Preferably, the second pivot arm is connected and/or coupled to the cross strut of the receiving device, in particular, in a movable manner, for example, via the third pivot axle.

The cross strut and/or the legs are formed, for example, in a strip-like manner and/or, for example, in a cross-sectionally L-shaped manner. If the legs are provided in a cross-sectionally L-shaped manner, it is possible, for example, for the carrier element to be arrangeable on the receiving device in a manner resting on a first side face of the L. Furthermore, it is conceivable for the receiving device to be provided such that the carrier element arranged in a resting manner on the receiving device is guidable and/or supportable laterally by the second sides of the legs, which protrude in particular perpendicularly to the first side face, for example upwardly.

The apparatus as claimed, wherein the receiving device is configured in a rodlike manner, wherein a longitudinal axis of the rodlike receiving device is provided parallel to the horizontal movement plane of the pivoting member. As a result, an engagement face of the receiving device with an arranged carrier element is comparatively enlarged.

It is also conceivable for the receiving device to have a connecting means, wherein the carrier element is arrangeable, in particular suspendable, on the connecting means, in particular on the receiving device, by way of a suspending movement, for example a pivoting and/or rotary movement, which runs at an angle, advantageously perpendicularly to the movement plane of the pivoting member.

Furthermore, it is proposed that guiding elements be provided, wherein the guiding elements are arrangeable on inner side walls of the body, wherein the guiding elements are provided, in the state arranged on the body, to guide a movement of the pivoting member, in particular of the arranged carrier element, for example laterally. As a result, tilting of a movement of the arranged carrier element or of a movement of the pivoting member with the arranged carrier element is avoided.

The guiding elements are provided, for example, in a raillike manner. In the arranged state of the carrier element, the carrier element is arranged in a manner bearing, for example, against the raillike guiding elements, in particular, pushed into the raillike guiding elements. The guiding elements are configured to be suspendable, for example, on and/or in the side walls. The side walls of the body comprise, for example, a receiving region for receiving a guiding element. The receiving region is provided, for example, as an opening and/or hole in the side wall. It is also conceivable for a guiding element and/or a side wall to be configured in such a way that the guiding element is clampable to the side wall.

It also proves to be advantageous for the pivoting member to be configured such that an arranged carrier element is movable entirely out of the body, in particular out of the compartment of the oven, into an open position on the body. As a result, the carrier element is arrangeable on the pivoting member or removable from the pivoting member comparatively easily.

Advantageously, the first pivot arm has a pivot arm length such that the second pivot axle is movable into an open position by way of an opening movement of the pivot arm in the state arranged on the body, wherein the open position is located in the region, for example, the vicinity of the open side of the cavity. For example, the second pivot axle is located outside the cavity, in particular, outside the body, in the open position. Preferably, the second pivot arm is located outside the cavity, in particular, outside the body, in the open position in the state arranged on the body.

It is furthermore conceivable for the apparatus to be provided and fittable on the body in such a way that, for example, an arranged carrier element is movable from a closed position, in which the apparatus is located, for example, entirely in the body, into an open position, for example, in a linear movement of the receiving device and/or in a linear movement of the carrier element, outside the cavity of the body, in particular, outside the body. Advantageously, the apparatus, for example, with the carrier element, is provided, in particular, entirely in the cavity of the body in the closed position.

It is also proposed that the pivoting member be configured in such a way that an arranged carrier element is pivotable and/or displaceable in its horizontal movement plane in a direction perpendicular to the opening direction, starting from the open position. As a result, the carrier element is movable away from an access region of the opening of the body, in particular, in the state arranged on the apparatus.

It is conceivable for at least a part of the second pivot arm and/or the carrier element to be provided in a manner laterally offset with respect to the body in the open position. In the open position, the apparatus, in particular a pivot arm and/or the carrier element, has been moved advantageously into a position such that access to the cavity of the body is not limited and/or restricted. For example, the receiving device, in particular with the arranged carrier element, can first of all be movable out of the closed position and into a first open position outside the body, in particular, by way of a linear movement, and subsequently the receiving device, in particular with the arranged carrier element, is able to be brought into a second open position by way of a pivoting and/or rotary movement, wherein the second open position is advantageously offset laterally with respect to the opening of the body and/or located laterally next to the first open position.

A further advantageous variant of the present invention is a carrier element, wherein the carrier element has a guiding member, wherein the guiding member is configured to guide the carrier element in the state arranged on the apparatus and on the body, in particular, on the oven, during a movement of the apparatus on the side of the body, in particular, on the side of the compartment of the oven.

Preferably, the carrier element comprises two guiding members. It is conceivable for the two guiding members to be provided on the carrier element, in particular on the shelf, in a manner spaced apart from one another and located opposite one another. A guiding member comprises, for example, guiding means in order to support the carrier element on a side wall of the body in the state of the carrier element arranged on the apparatus. For example, the carrier element is provided between two side walls of the body in the arranged state and the two guiding members support the carrier element on the two opposite side walls of the body.

BRIEF DESCRIPTION OF THE DRAWINGS

A number of exemplary embodiments are explained in more detail on the basis of the following schematic drawings, with further details and advantages being specified.

DETAILED DESCRIPTION OF THE INVENTION

Figure 1:
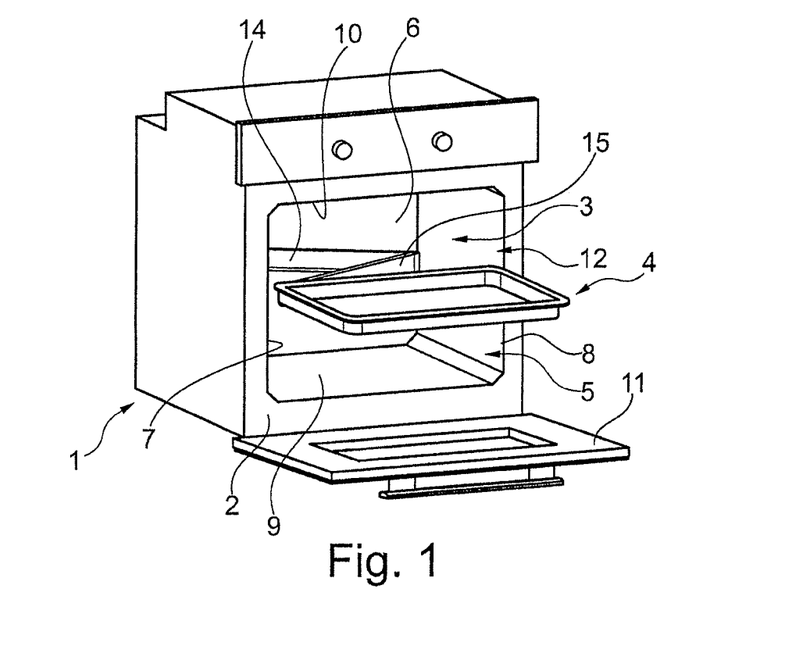
FIG. 1 shows a perspective view obliquely from the front of a body in the form of an oven compartment with an apparatus according to the present invention and an arranged carrier element in the form of a baking tray.

FIG. 1 shows an oven 1 with a compartment 2, and an apparatus 3 according to the present invention which is arranged in the compartment 2 and on which a carrier element in the form of a baking tray 4 has been fitted.

The compartment 2 comprises a cavity 5 which is provided, for example, to receive a baking tray 4. The cavity 5 is bounded on five sides by a rear wall 6, a first side wall 7, a second side wall 8, an underside 9 and a top side 10. The cavity 5 is advantageously configured as a cuboid and/or cube. On a sixth side, the cavity 5 comprises an opening 12, which is able to be bounded by an oven door 11. The oven door 11 is advantageously mounted on the oven 1 in a movable, in particular pivotable manner, wherein the oven door 11 is movable from a closed position on the oven 1, in which the oven door 11 bounds the cavity 5, into an open position on the oven 1, wherein the opening 12 of the cavity 5 is, in particular, entirely freed and accessible in the open state of the oven door 11.

Figure 2:
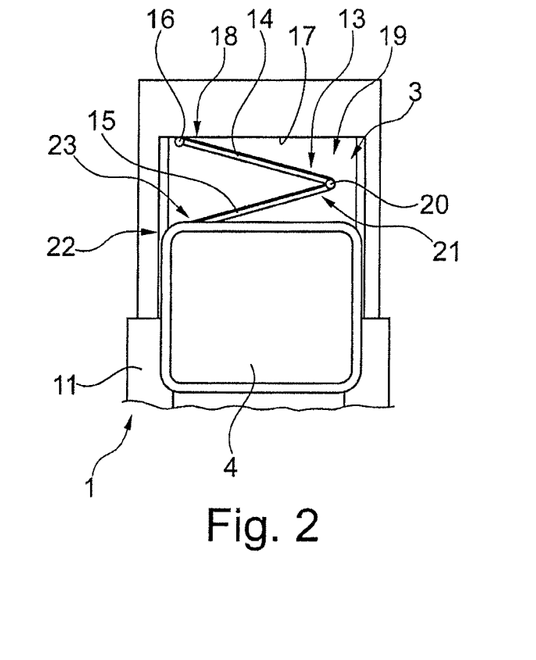
FIG. 2 shows a cross-sectional view of the body from FIG. 1 in a plan view of the body.
Figure 3:
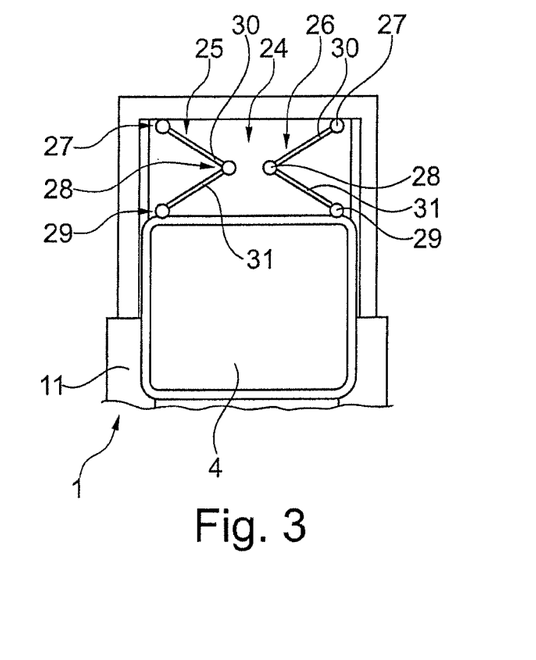
FIG. 3 shows a cross-sectional view of a body in a plan view, wherein a further apparatus variant is provided on the body.

FIGS. 2 and 3 show the oven 1 in a plan view, wherein a cross section of the oven 1 is illustrated, i.e. the view is through the top side 10, not illustrated in FIGS. 2 and 3, into the cavity 5 of the compartment 2.

FIG. 2 shows the apparatus 3 from FIG. 1. The apparatus 3 comprises a pivoting member 13, wherein the pivoting member 13 has a first pivot arm 14 and a second pivot arm 15. The pivoting member 13 is fastened, with a first end 18 of the first pivot arm 14, in a pivotable manner via a first pivot axle 16 to an inner side 17 of the rear wall 6 in a rear region of the compartment 2. Advantageously, the first pivot axle 16 is arrangeable in a corner region of the compartment 2. For example, in a corner region which is formed by the rear wall 6 and a side wall 7, 8. It is also conceivable for the pivoting member 13 to be fastenable to the rear wall 6 and to a side wall 7, 8. At a second end 19, the first pivot arm 14 is connected to a first end 21 of the second pivot arm 15 in a pivotable manner via a second pivot axle 20. The baking tray 4 arranged on the apparatus 3 is coupled to a second end 23 of the second pivot arm 15 in a movable, in particular pivotable manner by means of a third pivot axle 22 of the pivoting member 13 (provided beneath the baking tray 4, and therefore not visible, in FIG. 2).

FIG. 3 shows a further apparatus variant 24, wherein the apparatus 24 comprises two pivoting members 25, 26 which are preferably provided in an identical manner and are formed in a mirror-symmetrical manner with respect to one another in the state arranged on the compartment 2. A first pivoting member 25 is arranged on the inner side 17 of the rear wall 6 in a first corner region of the compartment 2 and a second pivoting member 26 is fitted to the inner side 17 of the rear wall 6 in a second corner region of the compartment 2, separately from the first pivoting member 25 and in a manner spaced apart from the first pivoting member 25. Both pivoting members 25, 26 are provided in a similar, in particular, identical manner to the pivoting member 13 of the apparatus 3 and comprise three pivot axles 27-29 and two pivot arms 30, 31. Furthermore, the two pivoting members 25, 26 are arranged on the rear wall 6 such that the pivoting members 25, 26, or the pivot arms 30, 31 of the pivoting members 25, 26, have a single common movement plane, which is oriented in particular horizontally, for example, parallel to the underside 9 and/or to the top side 10 of the compartment 2. Also shown is the fact that, in the arranged state of the baking tray 4, the two pivoting members 25, 26 are coupled to the baking tray 4 with their second pivot arms 31 in a pivotable or rotatable manner via third pivot axles 29.

FIGS. 4 to 10 show a use sequence of the apparatus 3 with the baking tray 4.

Figure 4:
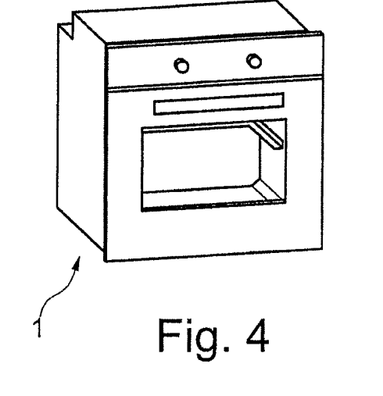
FIGS. 4 to 9 show, in perspective views obliquely from the front of the body from FIG. 1, a possible movement sequence of an apparatus arranged on the body or of the carrier element.

FIG. 4 shows the oven 1 with the arranged apparatus 3, wherein the oven door 11 is in the closed position.

Figure 5:
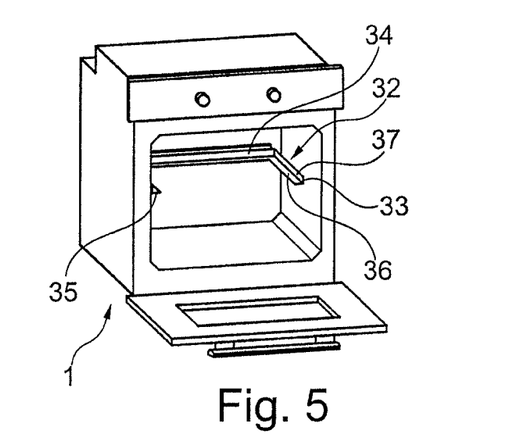

In FIG. 5, the oven door 11 is in the open position and the apparatus 3 is in a position moved, in particular, entirely into the compartment 2. Furthermore, a receiving device 32 of the apparatus 3 is shown. The receiving device 32 is coupled to the second pivot arm 15 in a pivotable manner via the third pivot axle 22. The receiving device 32 is configured in a U-shaped manner. Struts 33-35 of the U-shaped receiving device 32 are provided advantageously in an L-shaped manner. As a result, not only is the receiving device 32 configured in a stable manner, but the struts 33-35 form, with a first side 36, a bearing surface for the baking tray 4, in order for the baking tray 4 to be placed on the bearing surface, and, with a second side 37, a stop surface provided at an angle to the first side 36, with the result that the baking tray 4 is held on the receiving device 32 on three sides.

Figure 6:
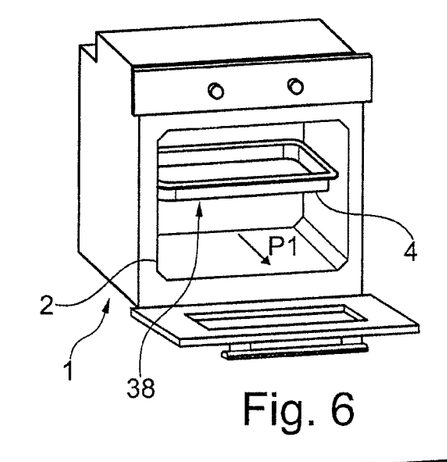
Figure 7:
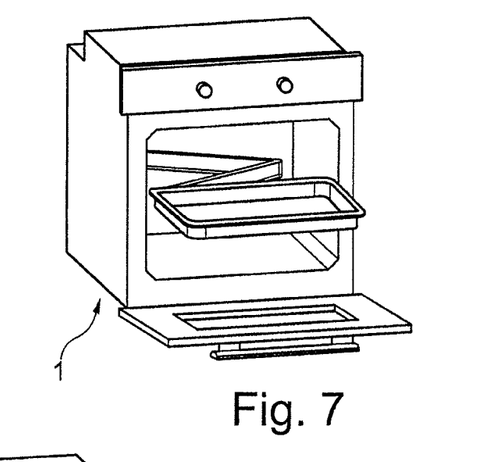
Figure 8:
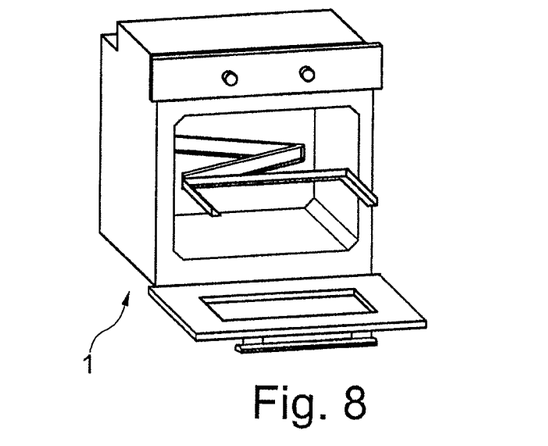
Figure 9:
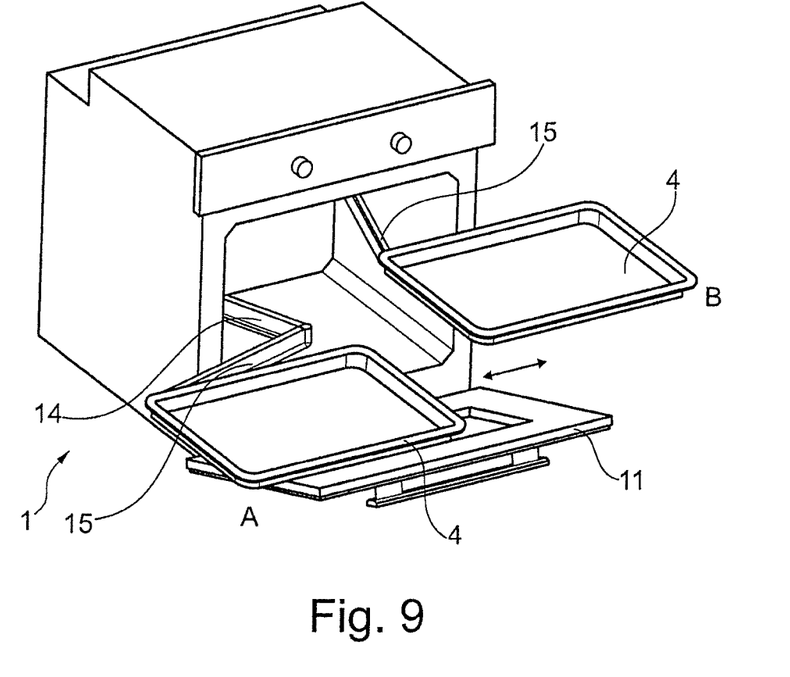

In FIG. 6, the baking tray 4 is present in the compartment 2 of the oven 1 in a manner placed on the receiving device 32. In the placed state, the baking tray 4 is held by the apparatus 3 and is movable into an open position on the compartment 2 by a user, for example by the user grasping the baking tray 4 in a front side region 38 and pulling it out of the compartment 2 in an opening direction P1. The baking tray 4 is in this case kept in its horizontal position by the apparatus 3, wherein the pivot arms 14, 15 unfold from a folded-together position, for example, in the manner of a concertina, from the position moved, in particular, entirely into the compartment 2, into an open position (FIG. 7). In the open position of the baking tray 4 on the compartment 2, it is possible for a user to move the baking tray 4 comparatively easily away from the apparatus 3 and from the receiving device 32, for example, to move it out or lift it off (FIG. 8). It is also possible for a user to shift the baking tray 4, in a manner guided by the apparatus 3, from the open position (FIG. 7) into a further open position to the side of the compartment 2 (FIG. 9), for example, in a sliding movement of the baking tray 4. FIG. 9 shows, for example, two possible open positions A, B of the baking tray 4, into which, for example, the baking tray 4 can be moved laterally with respect to the compartment 2.

Figure 10:
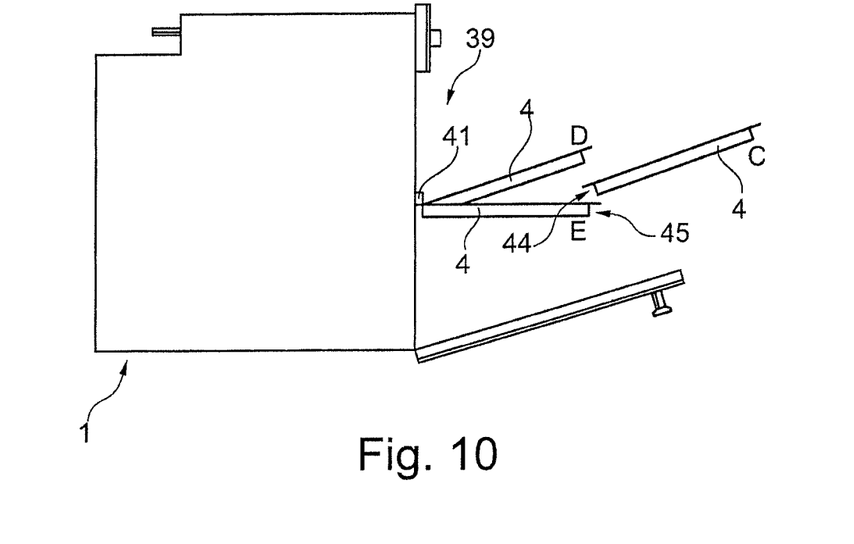
FIGS. 10 and 11 show a sequence of an operation for fitting a carrier element on an apparatus arranged on a body in a side view and in a perspective view obliquely from the front.
Figure 11:
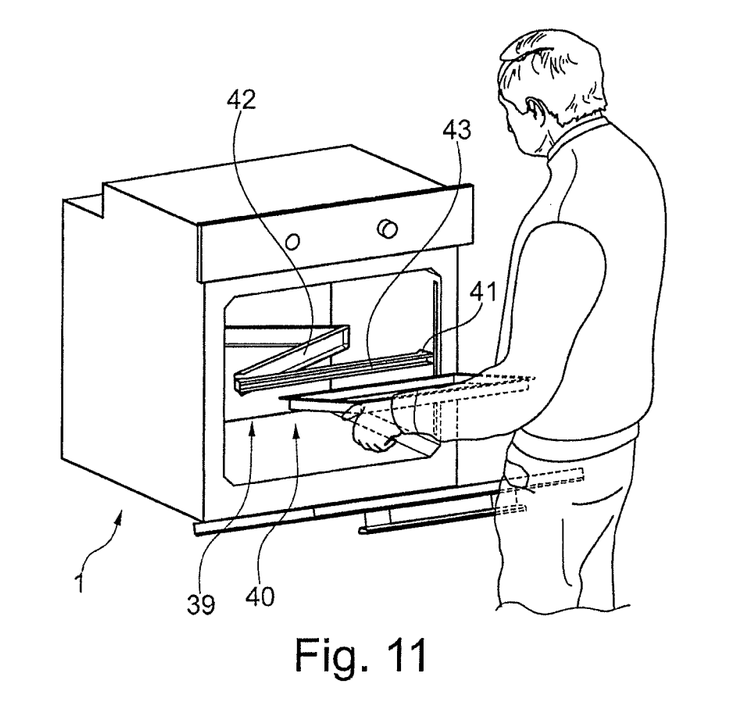

FIGS. 10 and 11 show a further apparatus variant 39 in the state arranged on the oven 1. The apparatus 39 comprises, in particular, in a manner identical to the apparatus 13, a pivoting member 40 which has three pivot axles and two pivot arms. In contrast to the apparatus 13, the pivoting member 40 of the apparatus 39 comprises a further variant of a receiving device 41. The receiving device 41 is coupled to a second pivot arm 42 in a pivotable manner via a pivot axle of the pivoting member 40. The receiving device 41 is provided in a rodlike manner and has a fitting lip 43 that is provided on the compartment 2 in the opening direction in the arranged state of the apparatus 3. A longitudinal axis of the receiving device 41 is oriented preferably parallel to the rear wall 6 in the arranged state of the apparatus 39 on the oven 1. The fitting lip 43 extends, for example, along the longitudinal axis of the receiving device 41.

The fitting lip 43 is configured, for example, such that the baking tray 4 is able to be suspended obliquely from above on the fitting lip 43 with a peripheral side 44 in a pivoting movement (FIG. 10). FIG. 10 illustrates a suspending operation of the baking tray 4 by way of example. The baking tray 4 is, to this end, depicted in three positions C, D, E. Position C shows the baking tray 4 at a slight angle to the horizontal movement plane of the apparatus 39 in front of the oven 1 (in this regard, see also FIG. 11). In position D, the baking tray 4 is present at the fitting lip 43 in the slightly angled position having been guided up to the receiving device 41, and in position E, the baking tray 4 has been suspended on the fitting lip 43, in a horizontally oriented position, by way of a downward pivoting movement of the peripheral side 45 of the baking tray 4, wherein the peripheral side 45 is present opposite the peripheral side 44.

| List of Reference Signs | |
| --- | --- |
| 1 | Oven |
| 2 | Compartment |
| 3 | Apparatus |
| 4 | Baking tray |
| 5 | Cavity |
| 6 | Rear wall |
| 7 | Side wall |
| 8 | Side wall |
| 9 | Underside |
| 10 | Top side |
| 11 | Oven door |
| 12 | Opening |
| 13 | Pivoting member |
| 14 | Pivot arm |
| 15 | Pivot arm |
| 16 | Pivot axle |
| 17 | Inner side |
| 18 | End |
| 19 | End |
| 20 | Pivot axle |
| 21 | End |
| 22 | Pivot axle |
| 23 | End |
| 24 | Apparatus |
| 25 | Pivoting member |
| 26 | Pivoting member |
| 27 | Pivot axle |
| 28 | Pivot axle |
| 29 | Pivot axle |
| 30 | Pivot arm |
| 31 | Pivot arm |
| 32 | Receiving device |
| 33 | Strut |
| 34 | Strut |
| 35 | Struts |
| 36 | Side |
| 37 | Side |
| 38 | Region |
| 39 | Apparatus |
| 40 | Pivoting member |
| 41 | Receiving device |
| 42 | Pivot arm |
| 43 | Fitting lip |
| 44 | Peripheral side |
| 45 | Peripheral side |

The invention claimed is:

1. An apparatus for mounting a carrier element in a body, the apparatus comprising: a pivoting member including at least first and second pivot arms provided in a rotatable manner with respect to one another, the at least the first pivot arm being arranged on the body in a rotatable manner by a first end thereof being pivotally connected to an inner surface of a rear wall in a rear region of the body via a first pivot axle, the at least the second pivot arm having a first end pivotally connected via a second pivot axle to a second end of the at least the first pivot arm; and a receiving member pivotally connected via a third pivot axle to a second end of the at least the second pivot arm and supporting the carrier element, the receiving member being substantially U-shaped and having a first substantially L-shaped side strut portion, a second substantially L-shaped side strut portion, and a substantially L-shaped rear strut portion substantially parallel with a rear wall of the body and pivotally connected to the third pivot axle, wherein the pivoting member moves the receiving member and the carrier element supported thereon in a single substantially horizontal movement plane between an external position outside the body and an internal position within the body, and wherein each strut portion includes a substantially horizontal bearing surface supporting a bottom surface of the carrier element, and a substantially vertical stop surface contacting a side surface of the carrier element.

2. The apparatus as claimed in claim 1, wherein the guide movement of the receiving member to the internal position within the body.

3. The apparatus as claimed in claim 1, wherein the carrier element, in the external position, is located entirely outside the body.

4. The apparatus as claimed in claim 1, wherein the pivoting member moves the carrier element in the substantially horizontal movement plane substantially perpendicular to an opening direction of a door provided in an opening of the body.

5. The apparatus as claimed in claim 1, wherein the body is a piece of furniture.

6. The apparatus as claimed in claim 1, wherein the body is an oven and the carrier element is a shelf in the oven.

\* \* \* \* \*